(12) United States Patent
Nagatoshi

(10) Patent No.: US 7,710,659 B2
(45) Date of Patent: May 4, 2010

(54) PROJECTION ZOOM LENS SYSTEM AND PROJECTION TYPE DISPLAY APPARATUS

(75) Inventor: Yukiko Nagatoshi, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/413,100

(22) Filed: Mar. 27, 2009

(65) Prior Publication Data
US 2009/0262437 A1 Oct. 22, 2009

(30) Foreign Application Priority Data
Apr. 17, 2008 (JP) ............................ P2008-107420

(51) Int. Cl.
G02B 15/14 (2006.01)
(52) U.S. Cl. .................... 359/682; 359/676; 359/683
(58) Field of Classification Search ................. 359/649, 359/680–682, 676, 683
See application file for complete search history.

(56) References Cited
U.S. PATENT DOCUMENTS

2002/0018301 A1 2/2002 Narimatsu et al.
2005/0200967 A1* 9/2005 Yamasaki et al. ........... 359/676
2006/0077564 A1* 4/2006 Baba .......................... 359/680
2007/0121214 A1* 5/2007 Kuo ........................... 359/680

FOREIGN PATENT DOCUMENTS

| JP | 2001-311872 A | 11/2001 |
| JP | 2003-202498 A | 7/2003 |
| JP | 2005-266103 A | 9/2005 |

\* cited by examiner

Primary Examiner—Scott J Sugarman
(74) Attorney, Agent, or Firm—Birch, Stewart, Kolasch & Birch, LLP

(57) ABSTRACT

A projection zoom lens includes a first lens group having a negative reflecting power and a second to fifth lens groups each having a positive reflecting power are provided in the order from the magnification side. Nine lenses are distributed in a manner that the first lens group has one lens, the second lens group has one lens, the third lens group has two lenses, the fourth lens group has four lenses and the fifth lens group has one lens. Since the second lens group, the third lens group and the fourth lens group are moved at the time of the power-varying operation, various kinds of aberrations may be made despite of simple configuration. The first lens group is an aspherical lens which concave surface is directed to the reduction side.

17 Claims, 9 Drawing Sheets

PROJECTION ZOOM LENS SYSTEM AND PROJECTION TYPE DISPLAY APPARATUS

The present invention claims priority from Japanese Patent Application No. 2008-107420 filed on Apr. 17, 2008, the entire content of which is incorporated herein by reference.

BACKGROUND OF INVENTION

1. Field of the Invention

The present invention relates to a small-sized projection zoom lens which is configured by 9 lenses of 5 groups and mounted on a projection type display apparatus etc. and also relates to the projection type display apparatus mounting the projection zoom lens thereon. In detail, the present invention relates to a projection zoom lens and a projection type display apparatus each of which is suitable in the case of projecting a luminous flux, having image information emitted from a light bulb such as a transmission type or reflection type liquid crystal display apparatus or a DMD (digital micromirror device) display apparatus, in a magnified form on a screen from the front side, in particular.

2. Description of the Related Art

In recent years, the projection type display apparatuses each using a light bulb such as a liquid crystal display apparatus or a DMD display apparatus have been widely spread. In particular, the projection type display apparatus has been widely utilized which is configured in a manner that three light bulbs are prepared and respectively associated with illumination lights of thee primary colors of R, G, B so as to modulate these illumination lights, then the lights modulated by the respective light bulbs are composed by a prism etc., and the composed light is displayed on a screen as an image via a projection lens system.

In such a projection lens system mounted on the projection type display apparatuses of a type which composes the modulated lights from the three light bulbs by a color composing optical system and projects the composed light, a large back focal length is required in order to dispose the prism etc. for composing colors as described above and to avoid a thermal problem. Further, since the spectral characteristics changes depending on the incident angle of an incoming light in the color composing optical system, the projection lens system is required to have characteristics that an entrance pupil locates at a far away position when seen from the reduction side, that is, to have the telecentricity. Further, the projection lens system is required to be fast and requires aberration correction according to the resolution of the light bulb.

Further, the projection lens system tends to be required to be small-sized, light weighted and low in its cost in accordance with the miniaturization of the light bulb itself, the increase of the demand for mobile uses, the shift to the low price of the projector etc. Furthermore, in order to project on a larger screen with a shorter projection distance in a narrow room, the zoom lens system is required to have a wide angle of view and to be easily adjusted in the size of a projection screen.

Although it is necessary to simplify the lens configuration in order to reduce the size and the weight of the projection lens system, the simplified zoom lens system having nine lenses of five groups is known as shown in JP-A-2001-311872, JP-A-2003-202498, and JP-A-2005-266103, for example. However, although the projection zoom lens described in each of the JP-A-2001-311872 and JP-A-2003-202498 is made relatively small in its size, the F number at the wide angle end thereof is a slow value of 2.0 or more, and the angle of view at the wide angle end thereof is a narrow value of 50 degree or less.

Further, in the projection zoom lens described in the JP-A-2005-266103, the F number at the wide angle end thereof is a fast value of 1.6 and the angle of view at the wide angle end is a relatively large value of 55 degree. However, since this projection zoom lens employs three lenses as the first lens group of which lens diameter becomes large, it is difficult to reduce the size and the weight of the entire lens system.

SUMMARY OF INVENTION

The present invention is made in view of the aforesaid circumstances and an object of the present invention is to provide a low-cost and small-sized projection zoom lens which may simplify the first lens group in a zoom lens system having nine lenses of five groups, may set the F number at the wide angle end thereof to be 1.7 or less and the angle of view thereof to be 55 degree or more, and may correct various kinds of aberrations.

According to a first aspect of the invention, projection zoom lens includes in order from a magnification side thereof, a first lens group having a negative refractive power, a second lens group having a positive refractive power, a third lens group having a positive refractive power, a fourth lens group having a positive refractive power, and a fifth lens group having a positive refractive power, wherein the first lens group includes a first lens of an aspherical lens whose concave surface is directed to a reduction side, the second lens group includes a second lens being a positive lens, the third lens group includes, in order from the magnification side, a third lens of a positive lens and a fourth lens of a negative lens, the fourth lens group includes, In order from the magnification side, a fifth lens of an aspherical lens whose concave surface is directed to the magnification side, a sixth lens of a negative lens, a seventh lens of a positive lens and an eighth lens of a positive lens, the fifth lens group includes a ninth lens of a positive lens, and the projection zoom lens is, telecentric on the reduction side thereof. According to a second aspect of the invention, the projection zoom lens satisfies conditional expression (1):

$$\tan \omega w > 0.50$$

wherein $\omega w$ represents a half angle of view of the projection zoom lens at a wide angle end thereof: According to a third aspect of the invention, the projection zoom lens satisfies conditional expression (2):

$$L/I < 10.0$$

wherein L represents a distance from a surface on a most magnification side of the projection zoom lens to a surface on a most reduction side thereof, and I represents a maximum light ray height from an optical axis of the projection zoom lens on an image display element. According to a fourth aspect of the invention, the projection zoom lens satisfies conditional expression (3):

$$Fw < 2.0$$

wherein Fw represents an F-number of the projection zoom lens at a wide angle end thereof. According to a fifth aspect of the invention, the projection zoom lens satisfies conditional expression (4):

$$0.2 < f2/f3 < 1.0$$

wherein f2 represents a focal length of the second lens group, and f3 represents a focal length of the third lens group.

According to a sixth aspect of the invention, the aspherical lens of the first lens is a composite aspherical surface lens including a resin layer and a glass lens, wherein the resin layer is formed on a surface of the glass lens and a surface of the resin layer on a side opposite to the glass lens is formed in an aspherical shape form. According to a seventh aspect of the invention, the third lens and the fourth lens are joined to each other to form a cemented lens.

According to an eighth aspect of the invention, the sixth lens and the seventh lens are joined to each other to form a cemented lens.

According to a ninth aspect of the invention, the second lens group, the third lens group and the fourth lens group move along an optical axis of projection zoom lens during a power-varying operation of the projection zoom lens and the first lens group and the fifth lens group are stationary during the power-varying operation. According to a tenth aspect of the invention, a projection type display apparatus includes a light source, a light bulb, an illumination optical portion which leads a luminous flux emitted from the light source to the light bulb, and the projection zoom lens, wherein the light-bulb optically modulates the luminous flux emitted from the light source and the projection zoom lens projects a modulated luminous flux onto a screen.

In the projection zoom lens and the projection type display apparatus using the projection zoom lens, since the lens system is configured by nine lenses of five groups as a whole, the miniaturization and light-weighting may be performed easily. Further, since the system is configured of five groups of "negative, positive, positive, positive, positive" sequentially from the magnification side, the lens system is configured as the Retrofocus type lens configuration. Thus, a long back focal length may be secured with respect to the focal length and the reduction side may be configured in an almost telecentric manner.

Further, the nine lenses are distributed in a manner that the first lens group G1 has one lens, the second lens group G2 has one lens, the third lens group G3 has two lenses, the fourth lens group G4 has four lenses and the fifth lens group G5 has one lens. Further, the second lens group G2, the third lens group G3 and the fourth lens group G4 are set as groups to be moved at the time of the power-varying operation. Thus, various kinds of aberrations may be made preferable with a small number of the lenses.

Further, since the first lens group of which lens diameter becomes maximum is configured by one lens, the lens system may entirely be miniaturized, light-weighted and low in cost.

Further, since the three lens group is configured by the positive lens and the negative lens sequentially from the magnification side, the chromatic aberration may be corrected correctly. Further, since the aspherical lens of which concave surface is directed to the magnification side is disposed on the most magnification side of the fourth lens group, various kinds of aberrations, in particular, the spherical aberration and the comatic aberration may be corrected to thereby obtain a fast lens system.

Other aspects and advantages of the present invention will be apparent from the following description and the appended claims.

DESCRIPTION OF EXEMPLARY EMBODIMENTS

Figure 1:
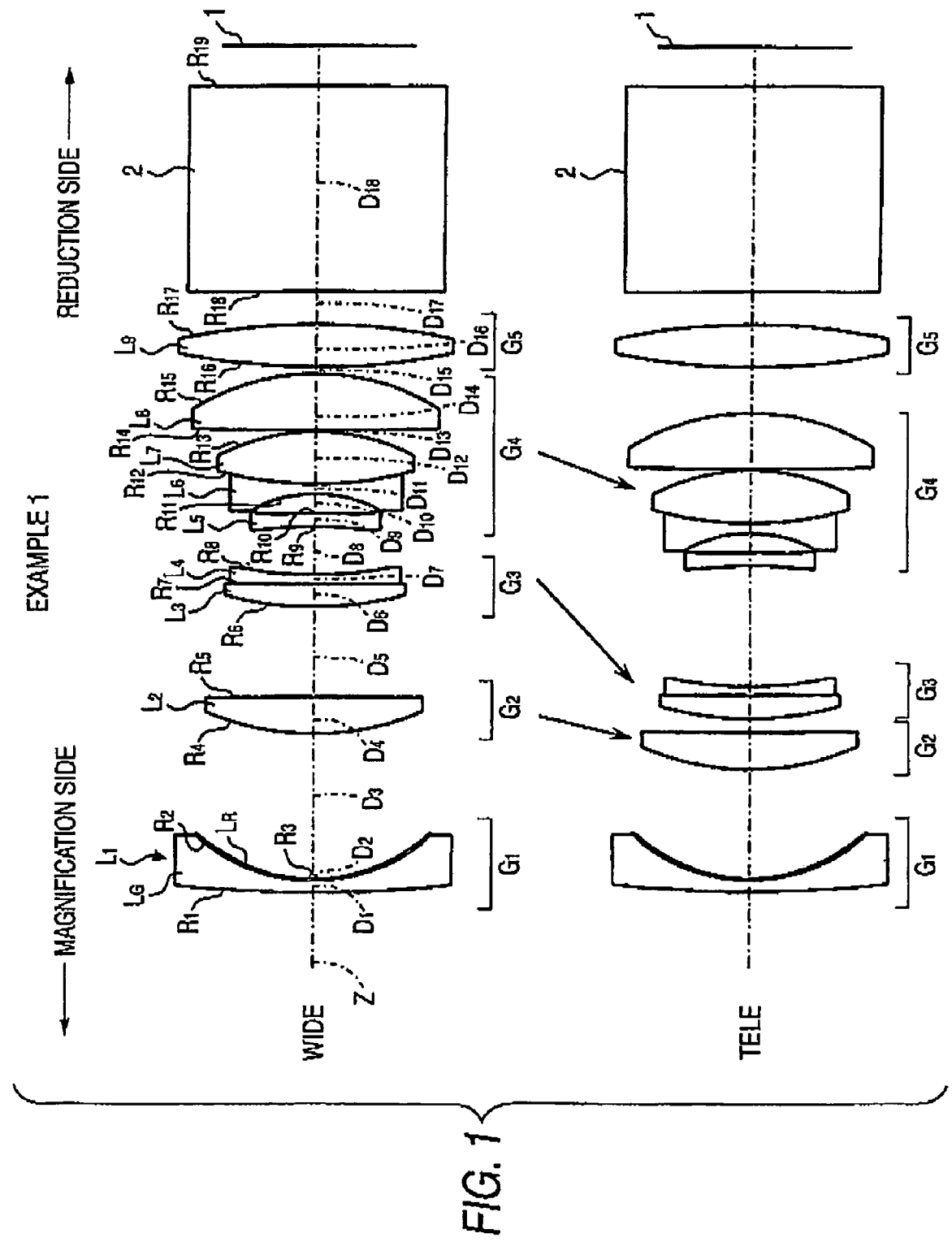
FIG. 1 is a schematic diagram showing the configuration at the wide angle end (WIDE) and the telephoto end (TELE) of a projection Zoom lens according to Example 1 of the present invention.

Hereinafter, concrete exemplary embodiments according to the present invention will be explained with reference to drawings. The projection zoom lens according to an exemplary embodiment (Example 1 is shown as a representative) shown in FIG. 1 includes a first lens group G1 having a negative reflecting power and a second lens group G2 to a fifth lens group G5 each having a positive reflecting power, in the order seen from the magnification side. The reduction side of the projection zoom lens is configured in an almost telecentric manner, and a glass block mainly configured by a color composing prism (including a filter portion) 2 and an image display surface 1 for a light bulb such as a liquid crystal display panel are disposed on the succeeding side of the fifth lens group. A character of Z in the figure depicts an optical axis.

The first lens group G1 is configured by a first lens L1 of a negative lens which concave surface is directed to the reduction side (in each of Example 1 to Example 4, the first lens L1 is configured as a complex aspherical lens which is formed by an aspherical glass lens $L_G$ and a resin layer $L_R$). The second lens group G2 is configured only by a second lens L2 of a positive lens. The third lens group G3 is configured by a third lens L3 of a positive lens and a fourth lens L4 of a negative lens, in the order seen from the magnification side. The fourth lens group G4 is configured by a fifth lens L5 of a aspherical lens which concave surface is directed to the magnification side, a sixth lens L6 of a negative lens, a seventh lens L7 of a positive lens and an eighth lens L8 of a positive lens. Further, the fifth lens group G5 is configured by a ninth lens L9 of a positive lens.

In this manner, nine lenses of the projection zoom lens are distributed into one lens of the first lens group G1, one lens of the second lens group G2, two lenses of the third lens group G3, four lenses of the fourth lens group G4 and one lens of the fifth lens group G5, the various kinds of aberrations may be set efficiently with a small number of the lenses.

The outer diameter of the lens constituting the first lens group G1 tends to be large. Although the degree of the miniaturization of the lens system is mainly determined according to the number of the lenses of the first lens group G1, since the first lens group G1 is constituted by the single lens in this exemplary embodiment, the zoom lens system may be made compact.

Further, although an aperture diaphragm is not shown, the aperture diaphragm may be provided at a suitable position (may be formed as a mask). Further, the aperture diaphragm may be configured so as to be moved integrally with the fourth lens group G4 at the time of the power-varying operation.

As described above, the projection zoom lens according to the exemplary embodiment is configured as the lens system of the Retrofocus type, whereby a suitable back focal length of the projection zoom lens may be secured with respect to the focal length and so the reduction side of the projection zoom lens may be configured in an almost telecentric manner.

The projection zoom lens according to the exemplary embodiment is configured to have the zooming function in a manner that at the time of the power-varying operation, the second lens group G2, the third lens group G3 and the fourth lens group G4 are mutually moved in the optical axis direction. The projection zoom lens may be configured to have the zooming function in a manner that two of these three lens groups are integrally moved, for example.

When the three lens groups of the second lens group G2, the third lens group G3 and the fourth lens group G4 are set as the lens groups to be moved, the aberration correction may be performed even with a small number of the lenses.

When the zoom lens system is configured to move each of the moving lens groups to the magnification side at the time of power-varying operation from the wide angle end to the telephoto end, the magnification ratio may be set larger.

Each of the moving lens groups is set in a manner that the magnification ratio is larger at the position of the telephoto end than the position of the wide angle end and does not exclude a state that the magnification ratio changes to the reduction side once at the intermediate area during the movement.

The focusing adjustment is performed by moving the first lens group G1 in the optical axis direction.

Further, the projection zoom lens according to the exemplary embodiment satisfies the following conditional expressions (1) to (4):

$$\tan \omega w > 0.50 \tag{1}$$

$$L/I < 10.0 \tag{2}$$

$$Fw < 2.0 \tag{3}$$

$$0.2 < f2/f3 < 1.0 \tag{4}$$

wherein

ωw: a half angle of a view at the wide angle end

L: a distance to a surface on the most reduction side from a surface on the most magnification side I: a maximum light ray height on an image display element Fw: F-number at the wide angle end f2: a focal length of the second lens group G2 f3: a focal length of the third lens group G3.

The technical meanings of the aforesaid conditional expressions (1) to (4) will be explained.

The conditional expression (1) defines that the tangent of the half angle of the view at the wide angle end is larger than 0.50, and it becomes difficult to secure a necessary angle of view when the tangent becomes smaller than the lower limit thereof.

The action and effects resulted from the conditional expression (1) may be more preferable, when the projection zoom lens is set so as to satisfy the following conditional expression (1') in place of the conditional expression (1).

$$\tan \omega w > 0.53 \tag{1'}$$

The conditional expression (2) defines that a ratio of the distance L to the surface on the most reduction side from a surface on the most magnification side with respect to the maximum light ray height I on an image display element is smaller than 10.0, and the lens length becomes too long when the ratio becomes larger than the upper limit thereof and so it becomes difficult to miniaturize the projection zoom lens.

The action and effects resulted from the conditional expression (2) may be more preferable when the projection zoom lens is set so as to satisfy the following conditional expression (2') in place of the conditional expression (2).

$$L/I < 7.0 \tag{2'}$$

The conditional expression (3) defines that the F-number at the wide angle end is smaller than 2.0, and it becomes difficult to secure necessary fast when the F-number becomes larger than the upper limit thereof.

The action and effects resulted from the conditional expression (3) may be more preferable when the projection zoom lens is set so as to satisfy the following conditional expression (3') in place of the conditional expression (3).

$$Fw < 1.8 \tag{3'}$$

The conditional expression (4) defines that a ratio of the focal length of the second lens group G2 with respect to the focal length of the third lens group G3 is larger than 0.2 and smaller than 1.0. When the ratio becomes larger than the upper limit thereof due to that the power of the second lens group G2 is too small, it becomes difficult to shorten the lens length. When the ratio becomes larger than the upper limit thereof due to that the power of the third lens group G3 is too large, the spherical aberration increases. On the other hand, when the ratio becomes smaller than the lower limit thereof due to that the power of the second lens group G2 is too large, it becomes difficult to correct the aberration of a peripheral image surface. When the ratio becomes smaller than the lower limit thereof due to that the power of the third lens group G3 is too small, the chromatic aberration on the axis increases.

The action and effects resulted from the conditional expression (4) may be more preferable when the projection zoom lens is set so as to satisfy the following conditional expression (4') in place of the conditional expression (4).

$$0.4 < f2/f3 < 0.7 \tag{4'}$$

The projection zoom lens according to each of the following respective examples includes aspherical lenses (the first lens L1 (an aspherical surface is a surface on the most reduction side) and the fifth lens L5 (aspherical surfaces are surfaces on the both sides) in each of Example 1 to Example 4), and the aspherical surface configuration is represented by the following aspherical surface expression.

$$Z = \frac{Y^2/R}{1+\sqrt{1-K*Y^2/R^2}} + \sum_{i=3}^{10} A_i Y^i \qquad \text{[Expression 1]}$$

where

Z: a length of a perpendicular line extended downward on the contact plane (a plane vertical with respect to the optical axis) of the aspherical peak from a point on the aspherical surface away from the optical axis by a length Y Y: a distance from the optical axis R: a radius of curvature near the optical axis of the aspherical surface K: an eccentricity $A_i$: an aspherical coefficient (i=3 to 10).

In particular, in order to efficiently correct the aberration etc., at least one surface of the first lens L1 is required to be formed as an aspherical surface. The first lens L1 may also be formed by a plastic aspherical lens or a glass mold aspherical lens. However, as described above, the aspherical surface (the surface on the reduction side of the first lens L1 in each of Example 1 to Example 4) is a composite aspherical surface which is formed in a manner that a resin layer $L_R$ is formed on the surface of a glass lens $L_G$ in an adhesive manner and a boundary surface between the resin layer $L_R$ and the air is formed as an aspherical surface. Since the first lens L1 is configured by the composite type aspherical surface, the first lens may be formed as a stable lens which is less in the changing degree of the refractive index and the shape thereof with respect to the change in the temperature and humidity as compared with the case where the first lens is configured as the plastic aspherical lens. Further, the first lens configured by the composite type aspherical surface is advantageous in cost ask compared with the case where the first lens is configured as the glass mold aspherical lens.

Further, when the third lens L3 and the fourth lens L4 are mutually combined or the sixth lens L6 and the seventh lens L7 are mutually combined, the chromatic aberration may be corrected in each case, desirably.

Figure 9:
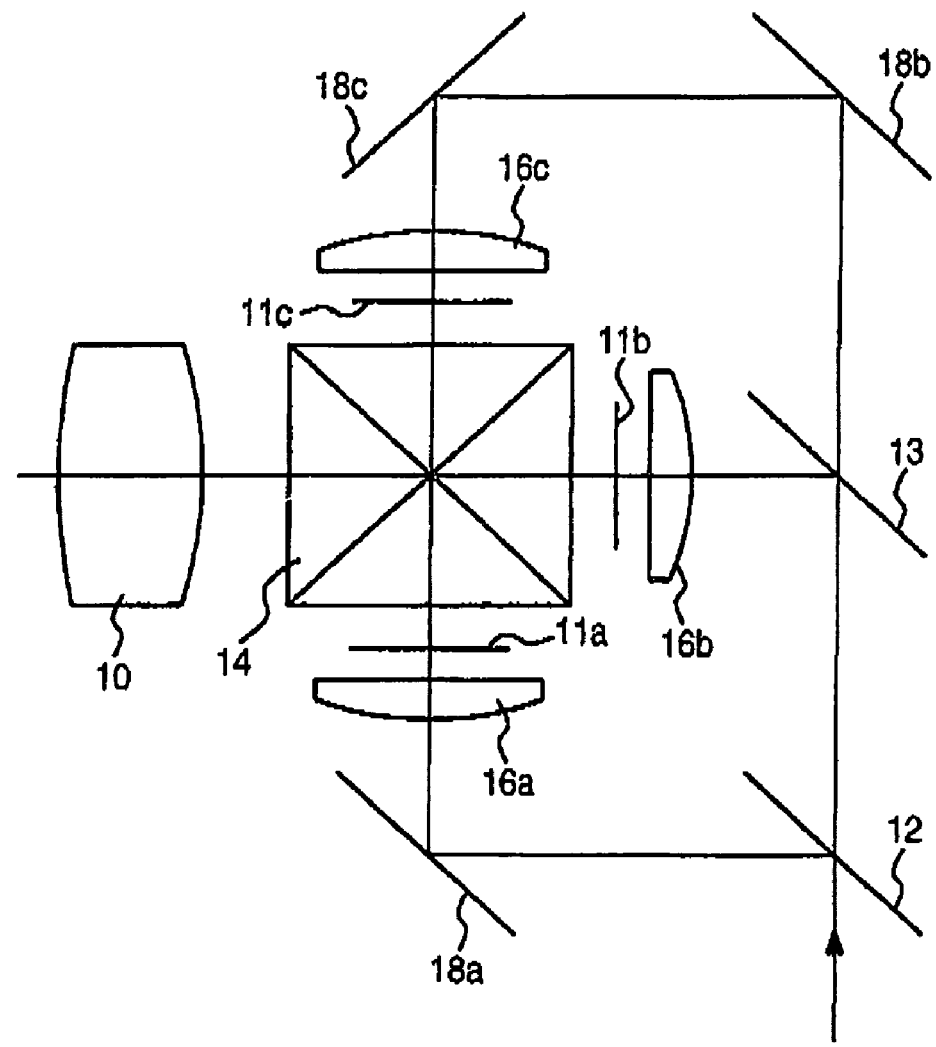
FIG. 9 is a diagram showing the schematic configuration of a projection type display apparatus according to an exemplary embodiment of the present invention.

Next, the explanation will be made with reference to FIG. 9 as to an example of the projection type display apparatus which mounts the aforesaid projection zoom lens thereon. The projection type display apparatus shown in FIG. 9 includes transmission type liquid crystal panels 11a to 11c as the light bulbs and uses the projection zoom lens according to the exemplary embodiment as a projection zoom lens 10. Further, an integrator (not shown) such as a fly eye is disposed between a light source 20 and a dichroic mirror 12. The white light from the light source 20 is incident into the liquid crystal panels 11a to 11c corresponding to three color luminous fluxes (G light, B light, R light) via an illumination optical portion and is light-modulated thereby, then the light-modulated fluxes are composed by a cross dichroic prism 14 and is projected on a not-shown screen by the projection zoom lens 10. The apparatus includes dichroic mirrors 12, 13 for the color separation, the cross dichroic prism 14 for the color composition, condensing lenses 16a to 16c, and total reflection mirrors 18a to 18c. Since the projection type display apparatus according to the exemplary embodiment employs the projection zoom lens according to the exemplary embodiment, the projection type display apparatus may be set to have a wide angle, good image quality and fast image as to a projection image, a small size and a light-weight.

The projection zoom lens according to the present invention is not limited in its using mode to the projection zoom lens of the zoom projection apparatus using the transmission type liquid crystal panels but may be used as the projection zoom lens etc. of the apparatus using other optical modulation means such as the reflection type liquid crystal display apparatus or the DMD.

EXAMPLES

Hereinafter, the projection zoom lens according to the present invention will be explained further with reference to concrete examples.

Example 1

The projection zoom lens according to Example 1 is configured as shown in FIG. 1 described above. That is, in the projection zoom lens, the first lens group G1 is configured only by the first lens L1 formed by a composite aspherical lens which is formed in a manner that the resin layer $L_R$ is formed on the surface of the glass lens $L_G$ in the adhesive manner and the boundary surface between the resin layer $L_R$ and the air is formed as the aspherical surface. The second lens group G2 is configured only by the second lens L2 formed by a positive meniscus lens which convex surface is directed to the magnification side.

The third lens group G3 is configured by the third lens L3 formed by a negative meniscus lens which convex surface is directed to the magnification side and the fourth lens L4 which concave surface is directed to the reduction side. The fourth lens group G4 is configured by the fifth lens L5 which concave surface is directed to the magnification side and each of the both side surfaces thereof is formed as a aspherical surface, the sixth lens L6 formed by a biconcave lens, the seventh lens L7 formed by a biconvex lens and the eighth lens L8 formed by a biconvex lens. The fifth lens group G5 is configured only by the ninth lens L9 formed by a biconvex lens.

At the time of power-varying operation, the second lens group G2, the third lens group G3 and the fourth lens group G4 independently move on the magnification side in accordance with the movement from the wide angle end to the telephoto end (same in Example 2 to Example 4).

Further, the focus adjustment is performed by moving the first lens group G1 to the optical axis direction (same in Example 2 to Example 4).

The top section of a table 1 shows the radiuses R of curvatures (the focal length at the wide angle end of the entire lens system is normalized as 1.0: same in the following tables) of the respective lens surfaces in Example 1, the center thicknesses of the respective lenses and surface spacing D between the adjacent lenses (normalized like the radiuses R of curvatures: same in the following tables), and refractive indexes Nd and Abbe numbers vd at the d-lines of the respective lenses. In each of the table 1 and tables 2 to 4 described later, numerals corresponding to these symbols R, D, Nd, vd are sequentially increased from the magnification side.

The intermediate section of the table 1 shows a variable 1 (a distance between the first lens group G1 and the second lens group G2), a variable 2 (a distance between the second lens group G2 and the third lens group G3), a variable 3 (a distance between the third lens group G3 and the fourth lens group G4) and a variable 4 (a distance between the fourth lens group G4 and the fifth lens group G5) at each of the wide angle end (WIDE), the intermediate (MIDDLE) and the telephoto end (TELE) (same in the second to fourth tables).

The lower section of the table 1 shows respective constants K, A3 to A10 corresponding to the respective aspherical surfaces, and the lowermost section f the table 1 shows a distance from the conjugated position on the magnification side to the first surface of the lens (the surface on the most magnification side) (same in the second to fourth tables).

TABLE 1

| surface No. | R | D | $N_d$ | $v_d$ |
|---|---|---|---|---|
| 1 | 6.633 | 0.072 | 1.58913 | 61.1 |
| 2 | 0.917 | 0.008 | 1.52771 | 41.8 |
| 3* | 0.807 | (variable 1) | | |
| 4 | 1.412 | 0.226 | 1.83400 | 37.2 |
| 5 | 137.172 | (variable 2) | | |
| 6 | 1.749 | 0.142 | 1.82000 | 46.0 |
| 7 | 106.407 | 0.053 | 1.65834 | 33.0 |
| 8 | 1.931 | (variable 3) | | |
| 9* | −1.402 | 0.080 | 1.68893 | 31.1 |
| 10* | −2.783 | 0.117 | | |
| 11 | −0.705 | 0.058 | 1.80517 | 25.4 |
| 12 | 1.917 | 0.323 | 1.74657 | 53.4 |
| 13 | −1.111 | 0.011 | | |
| 14 | 41.675 | 0.341 | 1.49700 | 81.5 |
| 15 | −1.238 | (variable 4) | | |
| 16 | 3.588 | 0.259 | 1.81999 | 33.5 |
| 17 | −3.411 | 0.200 | | |
| 18 | ∞ | 1.241 | 1.51633 | 64.1 |
| 19 | ∞ | | | |

| zoom ratio | (variable 1) | (variable 2) | (variable 3) | (variable 4) |
|---|---|---|---|---|
| WIDE | 1.00 | 0.893 | 0.545 | 0.294 | 0.042 |
| MIDELE | 1.13 | 0.739 | 0.249 | 0.585 | 0.243 |
| TELE | 1.20 | 0.672 | 0.085 | 0.736 | 0.323 | aspherical surface coefficient

| surface No. | K | A3 | A4 | A5 | A6 |
|---|---|---|---|---|---|
| 3 | 1.000 | −3.525E−03 | 2.307E−01 | −3.545E+00 | 1.462E+01 |
| 9 | 1.000 | 0.000E+00 | 2.348E+00 | 0.000E+00 | −8.894E+00 |
| 10 | 1.000 | 0.000E+00 | 2.517E+00 | 0.000E+00 | −6.427E+00 |

| surface No. | A7 | A8 | A9 | A10 |
|---|---|---|---|---|
| 3 | −3.331E+01 | 4.018E+01 | −2.277E+01 | 3.131E+00 |
| 9 | 0.000E+00 | 2.169E+01 | 0.000E+00 | −4.774E+01 |
| 10 | 0.000E+00 | 9.700E+00 | 0.000E+00 | −1.779E+01 |

*aspherical surface

A distance from conjugated position on magnification side to first surface of lens is 92.84

A table 5 shows numerals corresponding to the aforesaid conditional expressions (1) to (4) in Example 1.

Figure 5:
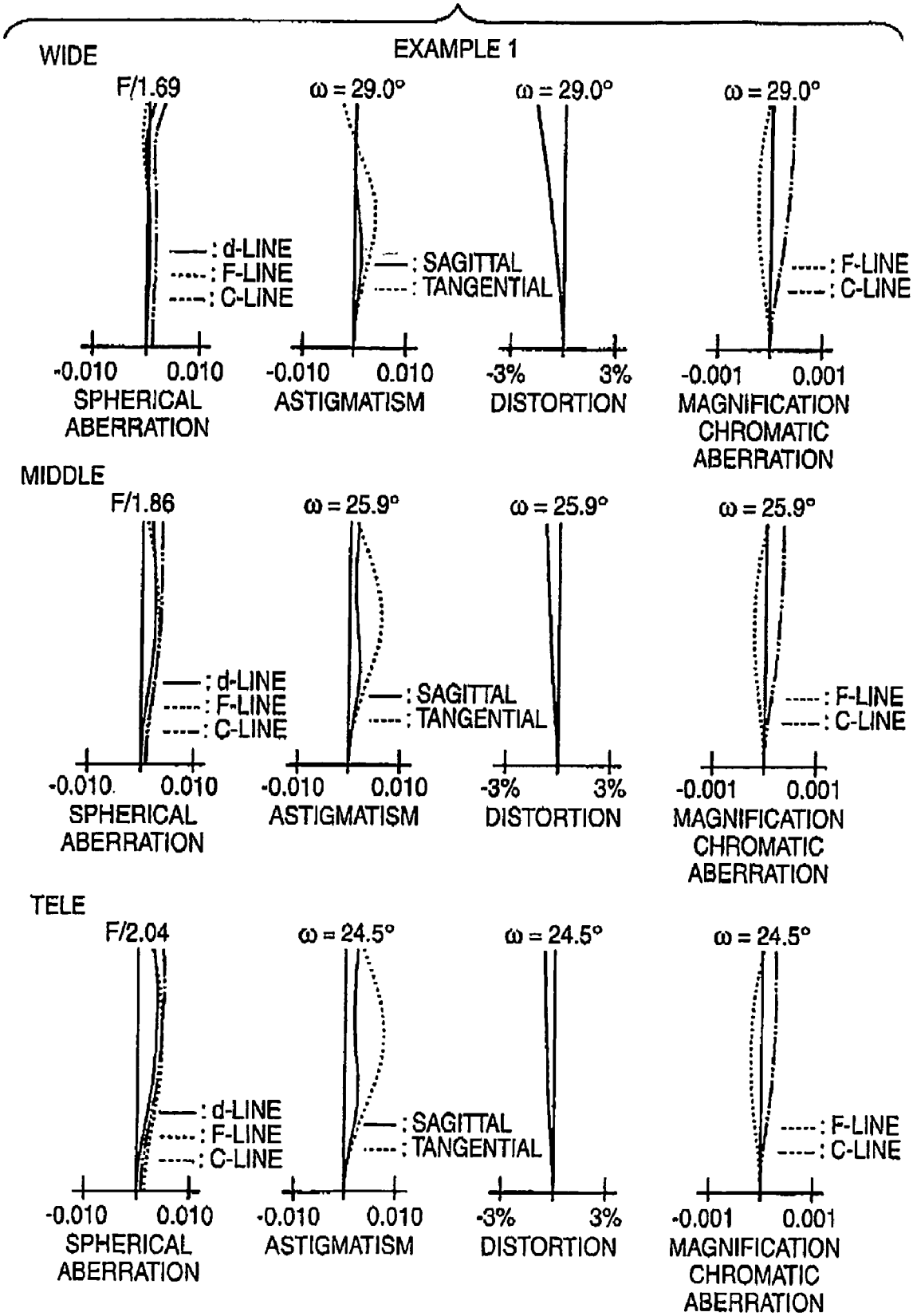
FIG. 5 is aberration diagrams showing various kind of aberrations (spherical aberration, astigmatism, distortion and lateral chromatic aberration) at each of the wide angle end (WIDE), the intermediate (MIDDLE) and the telephoto end (TELE) of Example 1.

FIG. 5 is aberration diagrams showing various kind of aberrations (spherical aberration, astigmatism, distortion and lateral chromatic aberration) at each of the wide angle end (WIDE), the intermediate (MIDDLE) and the telephoto end (TELE) of Example 1. In FIG. 5 and the following FIGS. 6 to 8, each of the spherical aberration, diagrams shows the aberrations with respect to the d-line, the F-line and the C-line, each of the astigmatism diagrams shows the aberrations with respect to the sagittal image surface and the tangential image surface, and each of the lateral chromatic aberration shows the aberrations of the d-line with respect to the F-line and the C-line.

As clear from FIG. 5, according to the projection zoom lens of Example 1, the angle of view 2ω at the wide angle end is a large angle of 58.0 degree, the F number at the wide angle end is a fast value of 1.69 and so the respective aberrations are corrected.

Further, as shown in the table 5, according to the projection zoom lens of Example 1, the conditional expressions (1) to (4) are satisfied and further the conditional expressions (1'), (2'), (3') and (4') are also satisfied.

Example 2

Figure 2:
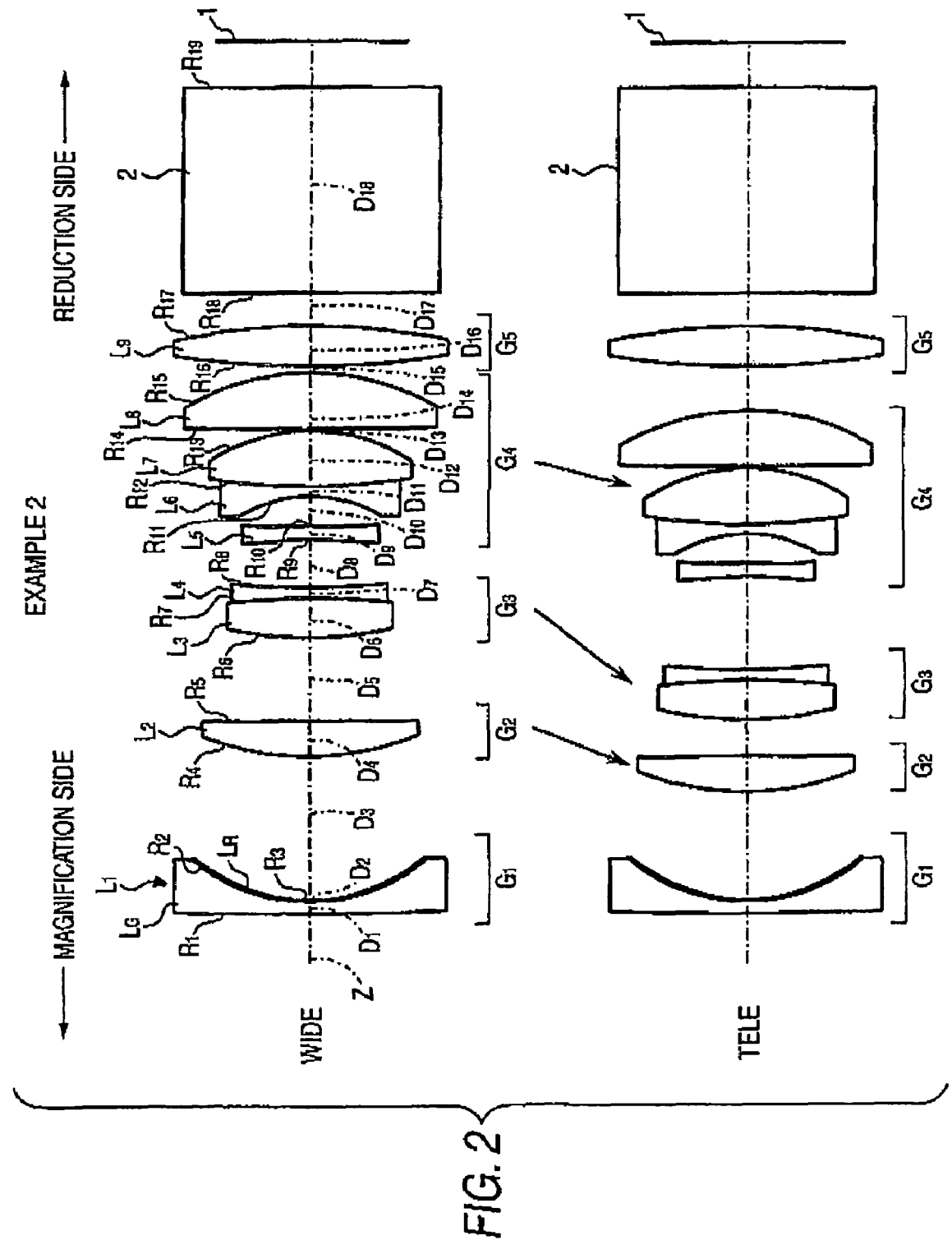
FIG. 2 is a schematic diagram showing the configuration at the wide angle end (WIDE) and the telephoto end (TELE) of a projection zoom lens according to Example 2 of the present invention.

The schematic configuration of the projection zoom lens according to Example 2 is shown in FIG. 2. The projection zoom lens according to Example 2 is formed so as to have almost the same configuration as Example 1 but differs therefrom mainly in a point that the second lens L2 is formed by a biconvex lens, the third lens L3 is formed by a biconvex lens and the fourth lens L4 is formed by a biconcave lens.

The table 2 shows the radiuses R of curvatures of the respective lens surfaces, the center thicknesses of the respective lenses and surface spacing D between the adjacent lenses, and the refractive indexes Nd and Abbe numbers vd at the d-lines of the respective lenses in this example 2.

TABLE 2

| surface No. | R | D | $N_d$ | $v_d$ |
|---|---|---|---|---|
| 1 | 25.778 | 0.072 | 1.58913 | 61.1 |
| 2 | 0.952 | 0.008 | 1.52771 | 41.8 |
| 3* | 0.829 | (variable 1) | | |
| 4 | 1.520 | 0.216 | 1.83400 | 37.2 |
| 5 | −176.143 | (variable 2) | | |
| 6 | 1.950 | 0.240 | 1.77250 | 49.6 |
| 7 | −3.909 | 0.064 | 1.69895 | 30.1 |
| 8 | 3.961 | (variable 3) | | |
| 9* | −1.441 | 0.080 | 1.80348 | 40.4 |
| 10* | −3.307 | 0.180 | | |
| 11 | −0.725 | 0.058 | 1.80517 | 25.4 |
| 12 | 3.256 | 0.341 | 1.67790 | 55.3 |
| 13 | −0.974 | 0.011 | | |
| 14 | 33.841 | 0.340 | 1.49700 | 81.5 |
| 15 | −1.312 | (variable 4) | | |
| 16 | 4.547 | 0.245 | 1.83400 | 37.2 |
| 17 | −3.438 | 0.200 | | |
| 18 | ∞ | 1.242 | 1.51633 | 64.1 |
| 19 | ∞ | | | |

| zoom ratio | (variable 1) | (variable 2) | (variable 3) | (variable 4) |
|---|---|---|---|---|
| WIDE | 1.00 | 0.886 | 0.505 | 0.294 | 0.042 |
| MIDELE | 1.13 | 0.734 | 0.325 | 0.472 | 0.239 |
| TELE | 1.20 | 0.668 | 0.222 | 0.566 | 0.313 | aspherical surface coefficient

| surface No. | K | A3 | A4 | A5 | A6 |
|---|---|---|---|---|---|
| 3 | 1.000 | −4.867E−03 | 2.390E−01 | −3.712E+00 | 1.541E+01 |
| 9 | 1.000 | 0.000E+00 | 2.234E+00 | 0.000E+00 | −1.026E+00 |
| 10 | 1.000 | 0.000E+00 | 2.379E+00 | 0.000E+00 | −8.195E+00 |

| surface No. | A7 | A8 | A9 | A10 |
|---|---|---|---|---|
| 3 | −3.600E+01 | 4.634E+01 | −3.048E+01 | 7.161E+00 |
| 9 | 0.000E+00 | 3.297E+01 | 0.000E+00 | −6.697E+01 |
| 10 | 0.000E+00 | 2.244E+00 | 0.000E+00 | −4.345E+01 |

*aspherical surface

A distance from conjugated position on magnification side to first surface of lens is 92.84

The table 5 shows numerals corresponding to the aforesaid respective conditional expressions in Example 2.

Figure 6:
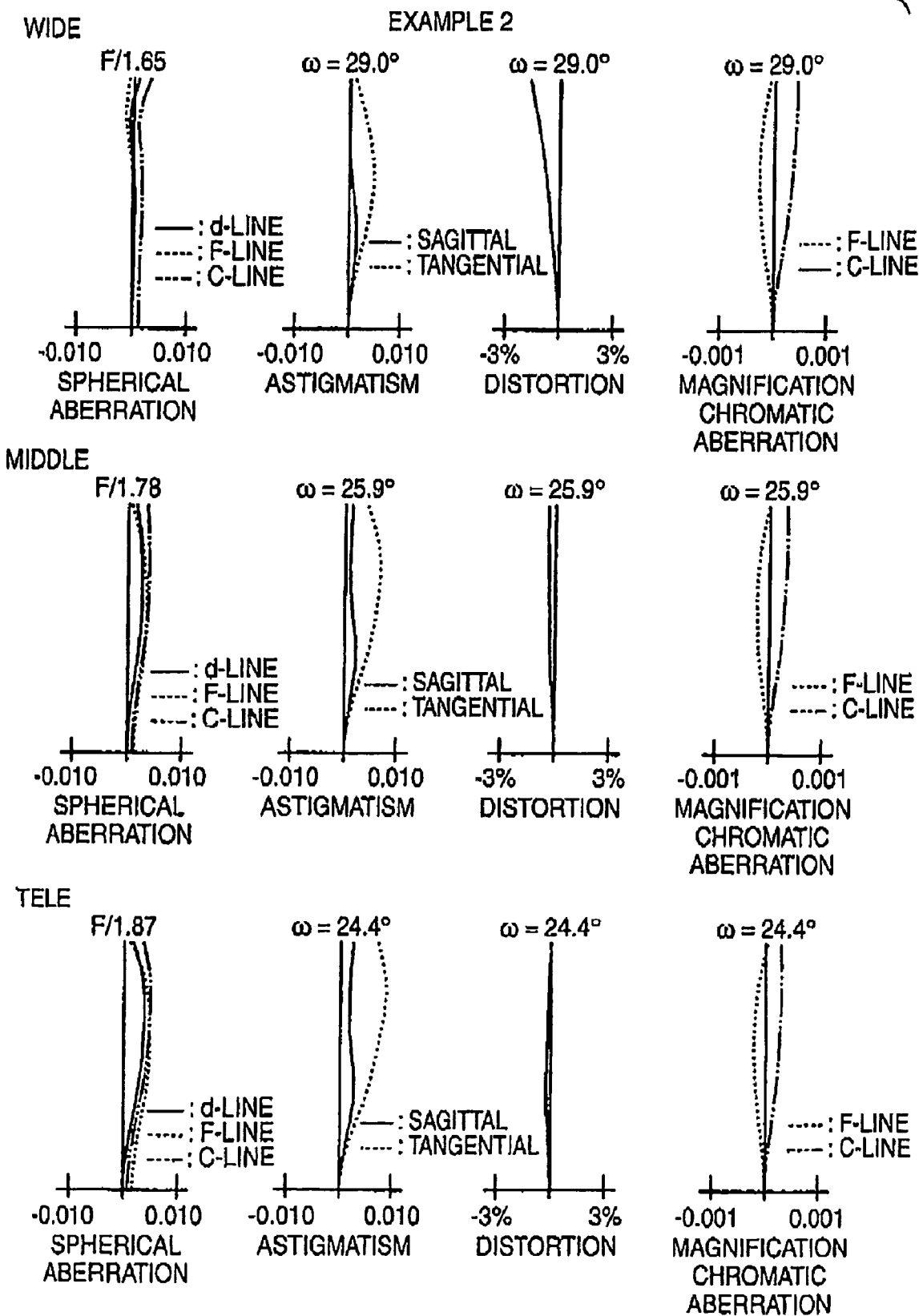
FIG. 6 is aberration diagrams showing various kind of aberrations (spherical aberration, astigmatism, distortion and lateral chromatic aberration) at each of the wide angle end (WIDE), the intermediate (MIDDLE) and the telephoto end (TELE) of Example 2.

FIG. 6 is aberration diagrams showing various kind of aberrations (spherical aberration, astigmatism, distortion and lateral chromatic aberration) at each of the wide angle end (WIDE), the intermediate (MIDDLE) and the telephoto end (TELE) of Example 2.

As clear from FIG. 6, according to the projection zoom lens of Example 2, the angle of view 2ω at the wide angle end is a large angle of 58.0 degree, the F number at the wide angle end is a fast value of 1.65 and so the respective aberrations are corrected.

Further, as shown in the table 5, according to the projection zoom lens of Example 2, the conditional expressions (1) to (4) are satisfied and further the conditional expressions (1'), (2'), (3') and (4') are also satisfied.

Example 3

Figure 3:
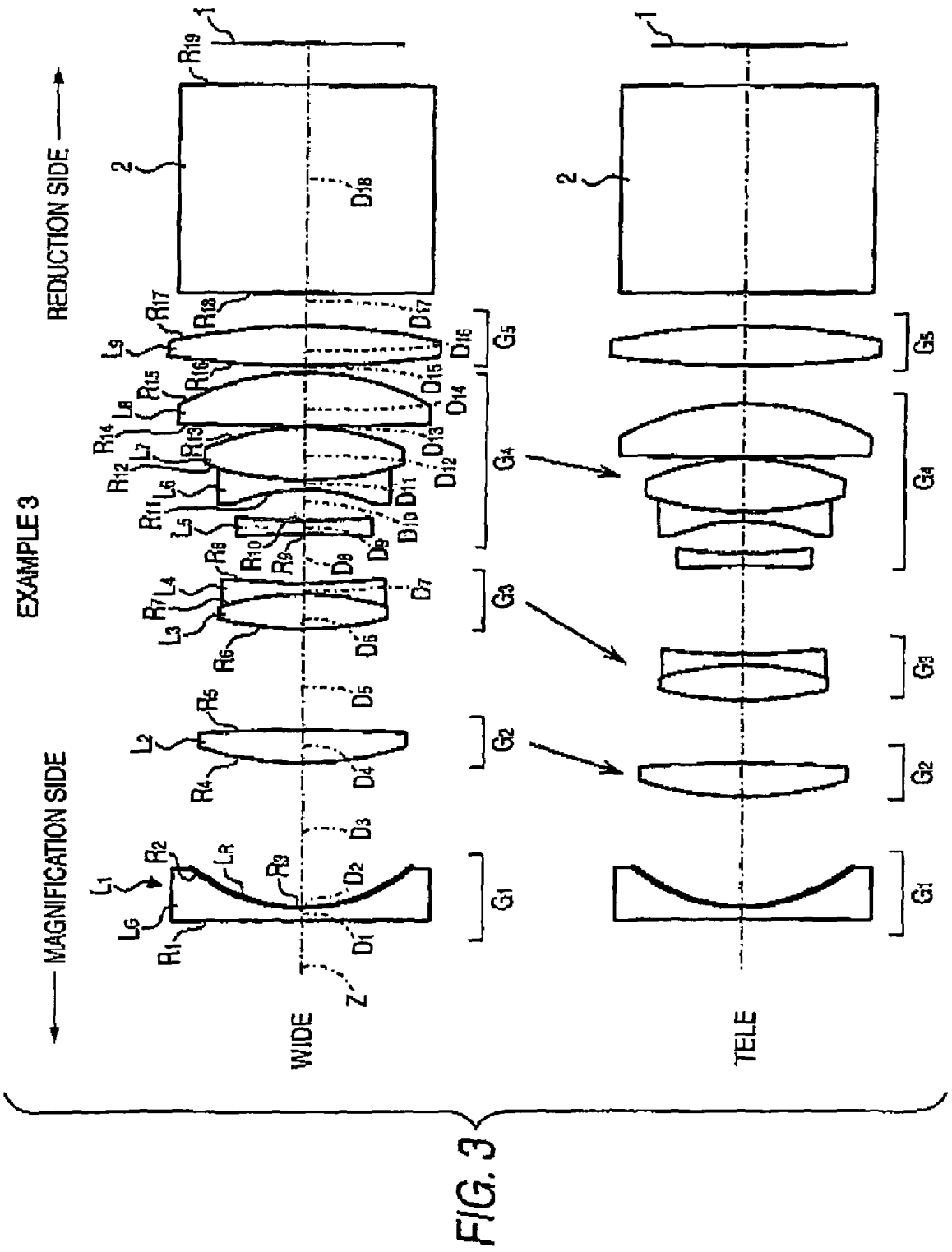
FIG. 3 is a schematic diagram showing the configuration at the wide angle end (WIDE) and the telephoto end (TELE) of a projection zoom lens according to Example 3 of the present invention.

The schematic configuration of the projection zoom lens according to Example 3 is shown in FIG. 3. The projection zoom lens according to Example 3 is formed so as to have almost the same configuration as Example 2 but differs therefrom mainly in a point that the first lens L1 is formed by a biconcave lens.

The table 3 shows the radiuses R of curvatures of the respective lens surfaces, the center thicknesses of the respective lenses and surface spacing D between the adjacent lenses, and the refractive indexes Nd and Abbe numbers νd at the d-lines of the respective lenses in this example 3.

TABLE 3

| surface No. | R | D | $N_d$ | $\nu_d$ |
|---|---|---|---|---|
| 1 | −62.674 | 0.072 | 1.58913 | 61.1 |
| 2 | 0.924 | 0.008 | 1.52771 | 41.8 |
| 3* | 0.804 | (variable 1) | | |
| 4 | 1.817 | 0.200 | 1.83400 | 37.2 |
| 5 | −8.443 | (variable 2) | | |
| 6 | 1.769 | 0.212 | 1.79952 | 42.2 |
| 7 | −1.462 | 0.064 | 1.71736 | 29.5 |
| 8 | 3.485 | (variable 3) | | |
| 9* | −3.724 | 0.080 | 1.80348 | 40.4 |
| 10* | 7.201 | 0.185 | | |
| 11 | −0.985 | 0.058 | 1.78471 | 25.7 |
| 12 | 1.665 | 0.319 | 1.49700 | 81.5 |
| 13 | −1.276 | 0.011 | | |
| 14 | 24.085 | 0.324 | 1.69680 | 55.5 |
| 15 | −1.351 | (variable 4) | | |
| 16 | 5.115 | 0.241 | 1.83400 | 37.2 |
| 17 | −3.151 | 0.200 | | |
| 18 | ∞ | 1.241 | 1.51633 | 64.1 |
| 19 | ∞ | | | |

| zoom ratio | (variable 1) | (variable 2) | (variable 3) | (variable 4) |
|---|---|---|---|---|
| WIDE | 1.00 | 0.875 | 0.605 | 0.294 | 0.042 |
| MIDELE | 1.13 | 0.729 | 0.463 | 0.449 | 0.217 |
| TELE | 1.20 | 0.666 | 0.384 | 0.533 | 0.275 | aspherical surface coefficient

| surface No. | K | A3 | A4 | A5 | A6 |
|---|---|---|---|---|---|
| 3 | 1.000 | −3.830E−02 | 6.782E−01 | −6.089E+00 | 2.104E+01 |
| 9 | 1.000 | 0.000E+00 | 1.066E+00 | 0.000E+00 | −7.723E+00 |
| 10 | 1.000 | 0.000E+00 | 1.331E+00 | 0.000E+00 | −7.314E+00 |

| surface No. | A7 | A8 | A9 | A10 |
|---|---|---|---|---|
| 3 | −4.056E+01 | 4.051E+01 | −1.662E+01 | −6.173E−00 |
| 9 | 0.000E+00 | 2.841E+01 | 0.000E+00 | −5.670E+01 |
| 10 | 0.000E+00 | 2.503E+01 | 0.000E+00 | −4.889E+01 |

*aspherical surface

A distance from conjugated position on magnification side to first surface of lens is 92.84

The table 5 shows numerals corresponding to the aforesaid respective conditional expressions in Example 3.

Figure 7:
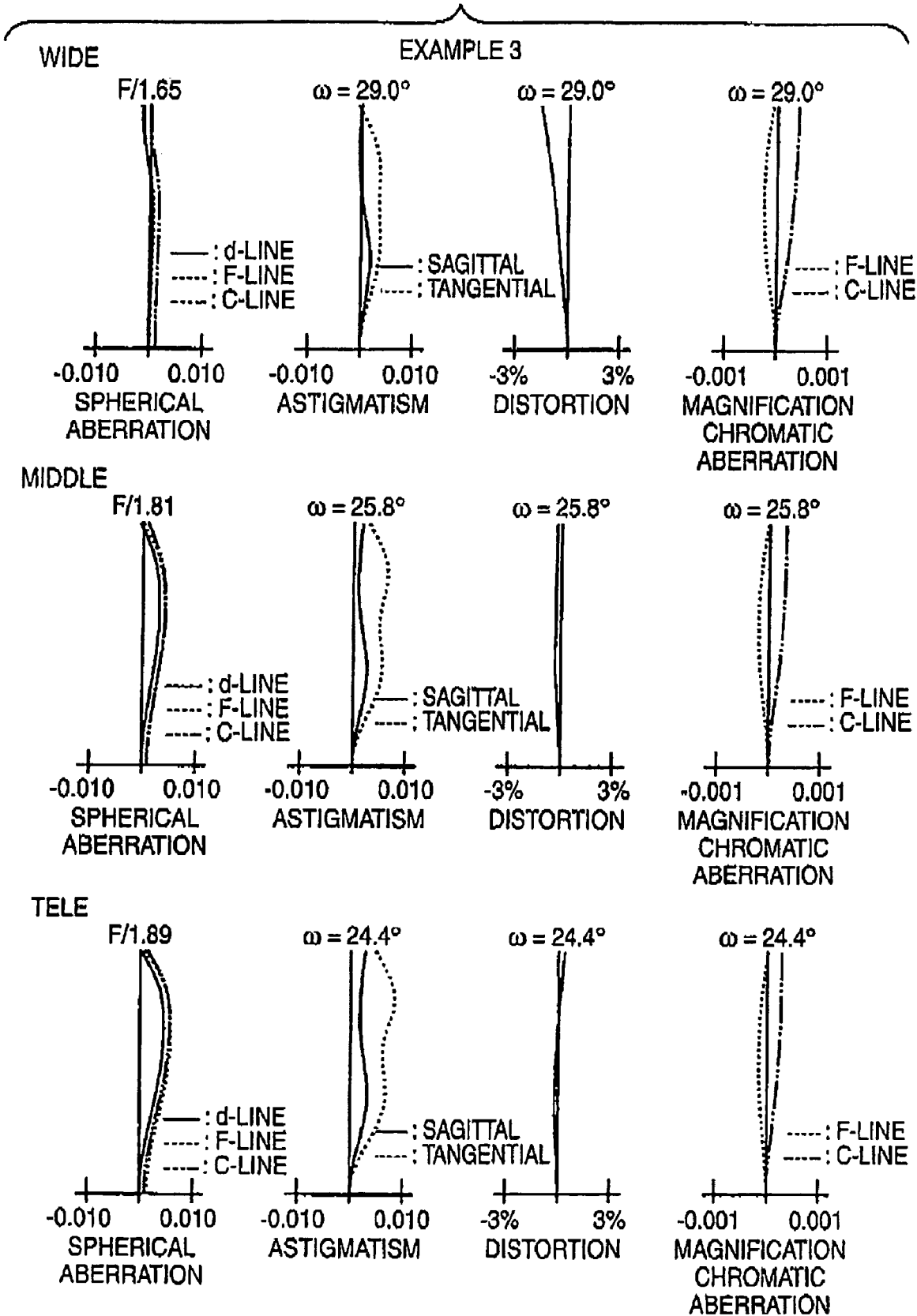
FIG. 7 is aberration diagrams showing various kind of aberrations (spherical aberration, astigmatism, distortion and lateral chromatic aberration) at each of the wide angle end (WIDE), the intermediate (MIDDLE) and the telephoto end (TELE) of Example 3.

FIG. 7 is aberration diagrams showing various kind of aberrations (spherical aberration, astigmatism, distortion and lateral chromatic aberration) at each of the wide angle end (WIDE), the intermediate (MIDDLE) and the telephoto end (TELE) of Example 3.

As clear from FIG. 7, according to the projection zoom lens of Example 3, the angle of view 2ω at the wide angle end is a large angle of 58.0 degree, the F number at the wide angle end is a fast value of 1.65 and so the respective aberrations are corrected.

Further, as shown in the table 5, according to the projection zoom lens of Example 3, the conditional expressions (1) to (4) are satisfied and further the conditional expressions (1'), (2'), (3') and (4') are also satisfied.

Example 4

Figure 4:
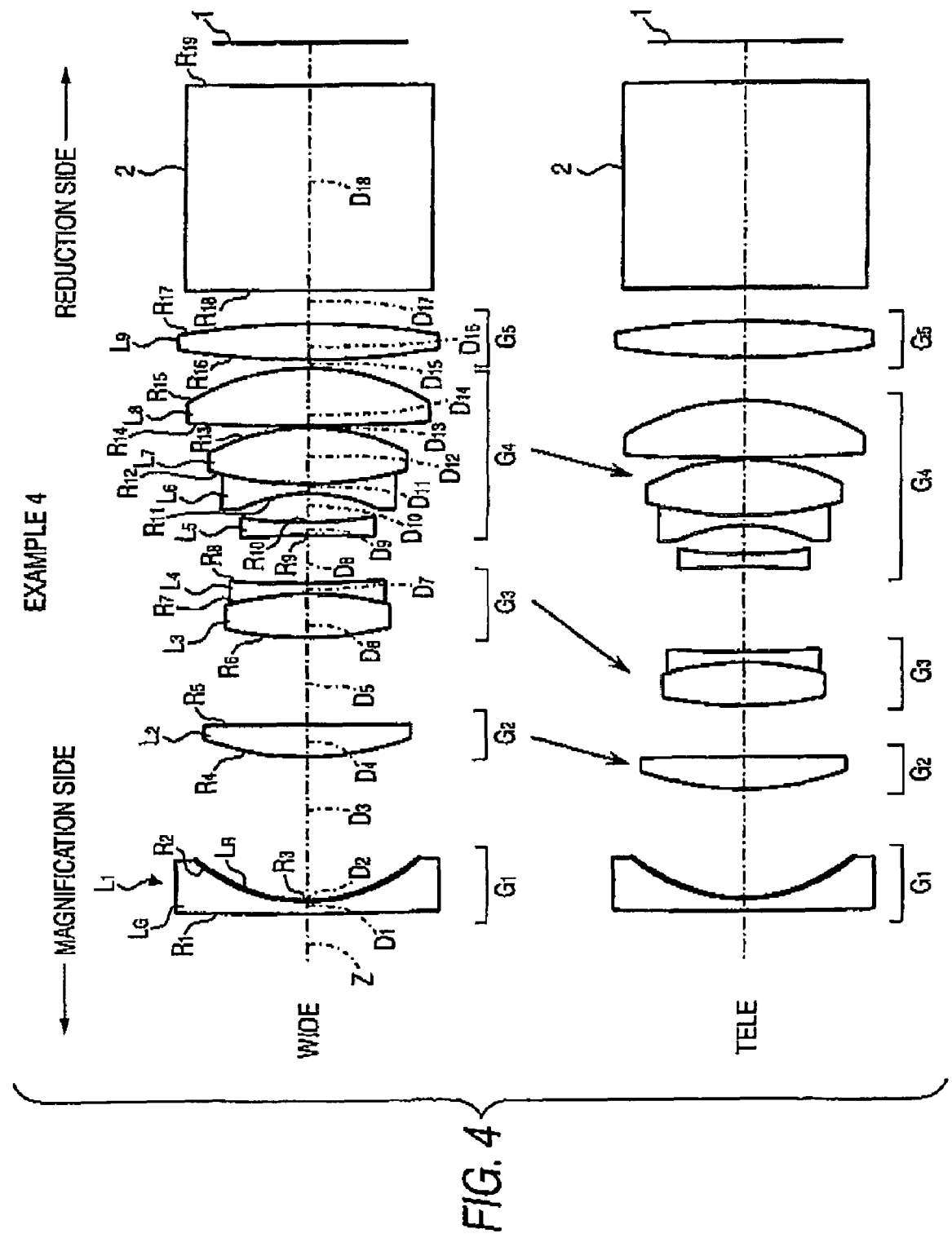
FIG. 4 is a schematic diagram showing the configuration at the wide angle end (WIDE) and the telephoto end (TELE) of a projection zoom lens according to Example 4 of the present invention.

The schematic configuration of the projection zoom lens according to Example 4 is shown in FIG. 4. The projection zoom lens according to Example 4 is formed so as to have almost the same configuration as Example 2

The table 4 shows the radiuses R of curvatures of the respective lens surfaces, the center thicknesses of the respective lenses and surface spacing D between the adjacent lenses, and the refractive indexes Nd and Abbe numbers νd at the d-lines of the respective lenses in this example 4.

TABLE 4

| surface No. | R | D | $N_d$ | $\nu_d$ |
|---|---|---|---|---|
| 1 | 31.813 | 0.072 | 1.58913 | 61.1 |
| 2 | 0.907 | 0.008 | 1.52771 | 41.8 |
| 3* | 0.793 | (variable 1) | | |
| 4 | 1.575 | 0.196 | 1.83400 | 37.2 |
| 5 | −47.878 | (variable 2) | | |
| 6 | 1.962 | 0.264 | 1.83400 | 37.2 |
| 7 | −1.560 | 0.064 | 1.80517 | 25.4 |
| 8 | 6.194 | (variable 3) | | |
| 9* | −3.523 | 0.080 | 1.80348 | 40.4 |
| 10* | 3.887 | 0.175 | | |
| 11 | −0.835 | 0.058 | 1.75519 | 27.5 |
| 12 | 1.889 | 0.344 | 1.61800 | 63.3 |
| 13 | −1.103 | 0.011 | | |
| 14 | 10.070 | 0.351 | 1.49700 | 81.5 |
| 15 | −1.206 | (variable 4) | | |
| 16 | 4.034 | 0.222 | 1.83400 | 37.2 |
| 17 | −4.034 | 0.200 | | |
| 18 | ∞ | 1.244 | 1.51633 | 64.1 |
| 19 | ∞ | | | |

| zoom ratio | (variable 1) | (variable 2) | (variable 3) | (variable 4) |
|---|---|---|---|---|
| WIDE | 1.00 | 0.878 | 0.531 | 0.294 | 0.051 |
| MIDELE | 1.13 | 0.730 | 0.391 | 0.437 | 0.196 |
| TELE | 1.20 | 0.665 | 0.313 | 0.514 | 0.262 | aspherical surface coefficient

| surface No. | K | A3 | A4 | A5 | A6 |
|---|---|---|---|---|---|
| 3 | 1.000 | −4.538E−02 | 7.446E−01 | −6.281E+00 | 2.105E+01 |
| 9 | 1.000 | 0.000E+00 | 1.214E+00 | 0.000E+00 | −8.858E+00 |
| 10 | 1.000 | 0.000E+00 | 1.561E+00 | 0.000E+00 | −8.429E+00 |

| surface No. | A7 | A8 | A9 | A10 |
|---|---|---|---|---|

TABLE 4-continued

| 3 | −4.043E+01 | 4.181E+01 | −1.952E+01 | 9.295E−00 |
| 9 | 0.000E+00 | 3.061E+01 | 0.000E+00 | −5.822E+01 |
| 10 | 0.000E+00 | 2.914E+01 | 0.000E+00 | −5.739E+01 |

*aspherical surface

A distance from conjugated position on magnification side to first surface of lens is 92.84

The table 5 shows numerals corresponding to the aforesaid respective conditional expressions in Example 4.

Figure 8:
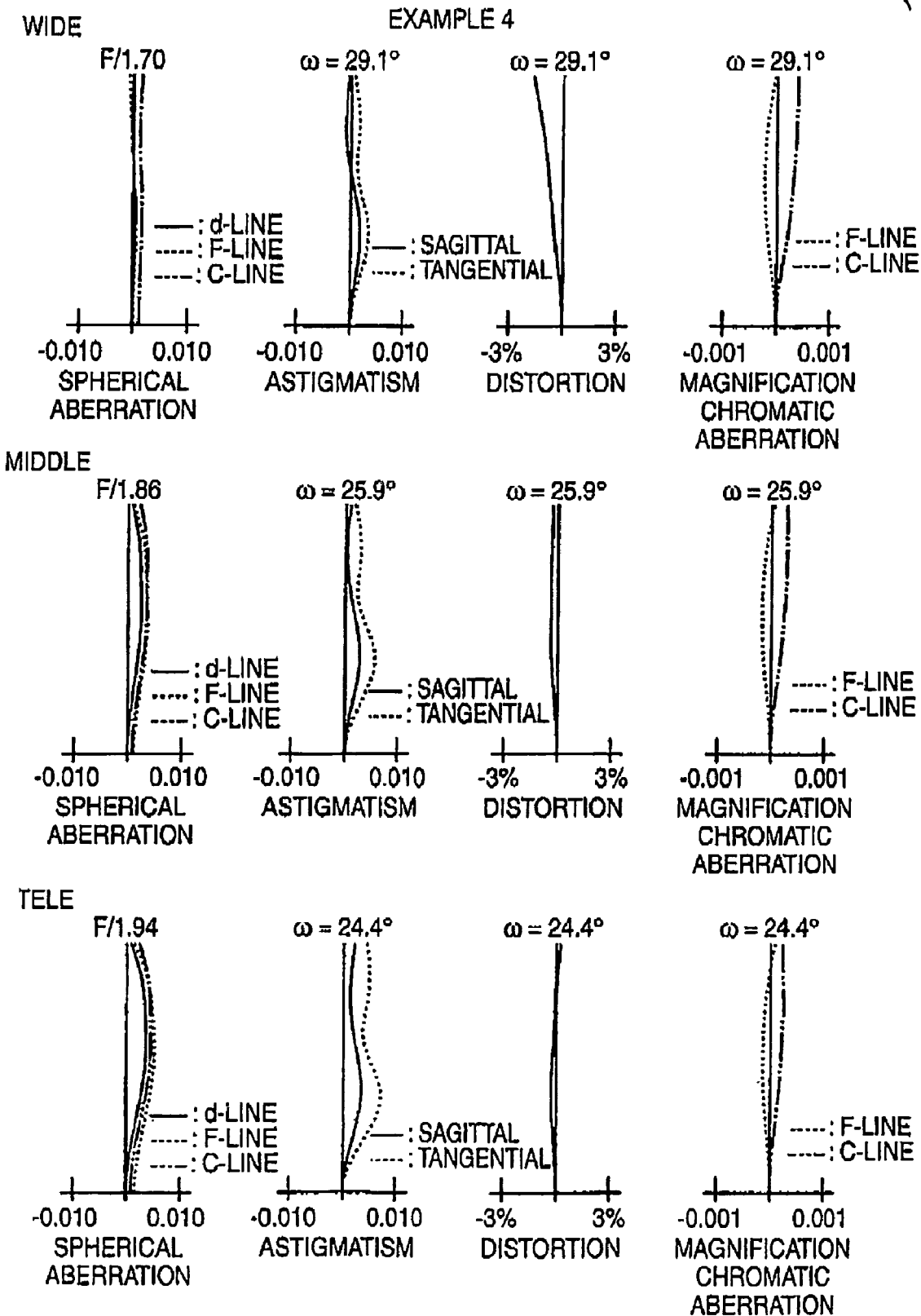
FIG. 8 is aberration diagrams showing various kind of aberrations (spherical aberration, astigmatism, distortion and lateral chromatic aberration) at each of the wide angle end (WIDE), the intermediate (MIDDLE) and the telephoto end (TELE) of Example 4.

FIG. 8 is aberration diagrams showing various kind of aberrations (spherical aberration, astigmatism, distortion and lateral chromatic aberration) at each of the wide angle end (WIDE), the intermediate (MIDDLE) and the telephoto end (TELE) of Example 4.

As clear from FIG. 8, according to the projection zoom lens of Example 4, the angle of view 2ω at the wide angle end is a large angle of 58.2 degree, the F number at the wide angle end is a fast value of 1.70 and so the respective aberrations are corrected.

Further, as shown in the table 5, according to the projection zoom lens of Example 4, the conditional expressions (1) to (4) are satisfied and further the conditional expressions (1'), (2'), (3') and (4') are also satisfied.

TABLE 5

|  | Example 1 | Example 2 | Example 3 | Example 4 |
|---|---|---|---|---|
| Expression (1) | 0.55 | 0.55 | 0.55 | 0.56 |
| Expression (2) | 6.34 | 6.56 | 6.57 | 6.58 |
| Expression (3) | 1.69 | 1.65 | 1.65 | 1.70 |
| Expression (4) | 0.48 | 0.45 | 0.57 | 0.45 |

What is claimed is:

1. A projection zoom lens comprising, in order from a magnification side thereof:
   a first lens group having a negative refractive power;
   a second lens group having a positive refractive power;
   a third lens group having a positive refractive power;
   a fourth lens group having a positive refractive power; and
   a fifth lens group having a positive refractive power;
   wherein the first lens group includes a first lens of an aspherical lens whose concave surface is directed to a reduction side of the projection zoom lens,
   the second lens group includes a second lens of a positive lens,
   the third lens group includes, in order from the magnification side, a third lens of a positive lens and a fourth lens of a negative lens,
   the fourth lens group includes, in order from the magnification side, a fifth lens of an aspherical lens whose concave surface is directed to the magnification side, a sixth lens of a negative lens, a seventh lens of a positive lens and an eighth lens of a positive lens,
   the fifth lens group includes a ninth lens of a positive lens, and
   the projection zoom lens is telecentric on the reduction side thereof.

2. The projection zoom lens according to claim 1, satisfying conditional expression (1):

$\tan \omega w > 0.50$ wherein
   ωw represents a half angle of view of the projection zoom lens at a wide angle end thereof.

3. The projection zoom lens according to claim 1, satisfying conditional expression (2):

$L/I < 10.0$ wherein
   L represents a distance from a surface on a most magnification side of the projection zoom lens to a surface on a most reduction side thereof, and
   I represents a maximum light ray height from an optical axis of the projection zoom lens on an image display element.

4. The projection zoom lens according to claim 1, satisfying conditional expression (3);

$Fw < 2.0$ wherein
   Fw represents an F-number of the projection zoom lens at a wide angle end thereof.

5. The projection zoom lens according to claim 1, satisfying conditional expression (4);

$0.2 < f2/f3 < 1.0$ wherein
   f2 represents a focal length of the second lens group, and
   f3 represents a focal length of the third lens group.

6. The projection zoom lens according to claim 1, wherein the aspherical lens of the first lens is a composite aspherical surface lens including a resin layer and a glass lens, wherein the resin layer is formed on a surface of the glass lens and a surface of the resin layer on one side opposite to the other side facing to the surface of the glass lens is formed in an aspherical shape.

7. The projection zoom lens according to claims 1, wherein the third lens and the fourth lens are joined to each other to form a cemented lens.

8. The projection zoom lens according to claim 1, wherein the sixth lens and the seventh lens are joined to each other to form a cemented lens.

9. The projection zoom lens according to claim 1, wherein the second lens group, the third lens group and the fourth lens group move along an optical axis of the projection zoom lens during a power-varying operation of the projection zoom lens and the first lens group and the fifth lens group are stationary during the power-varying operation.

10. The projection zoom lens according to claim 2, satisfying conditional expression (2):

$L/I < 10.0$ wherein
    L represents a distance from a surface on a most magnification side of the projection zoom lens to a surface on a most reduction side thereof, and
    I represents a maximum light ray height from an optical axis of the projection zoom lens on an image display element.

11. The projection zoom lens according to claim 2, satisfying conditional expression (3):

$Fw < 2.0$ wherein
    Fw represents an F-number of the projection zoom lens at a wide angle end thereof.

12. The projection zoom lens according to claim 2, satisfying conditional expression (4);

$0.2 < f2/f3 < 1.0$ wherein
    f2 represents a focal length of the second lens group, and
    f3 represents a focal length of the third lens group.

13. The projection zoom lens according to claim 3, satisfying conditional expression (3):

$$Fw<2.0$$

wherein

Fw represents an F-number of the projection zoom lens at a wide angle end thereof.

14. The projection zoom lens according to claim 3, satisfying conditional expression (4):

$$0.2<f2/f3<1.0$$

wherein f2 represents a focal length of the second lens group, and
f3 represents a focal length of the third lens group.

15. The projection zoom lens according to claim 4, satisfying conditional expression (4):

$$0.2<f2/f3<1.0$$

wherein f2 represents a focal length of the second lens group, and
f3 represents a focal length of the third lens group.

16. A projection type display apparatus, comprising:
a light source;
a light bulb;
an illumination optical portion which leads a luminous flux emitted from the light source to the light bulb; and
the projection zoom lens according to claim 1, wherein the light bulb optically modulates the luminous flux emitted from the light source and the projection zoom lens projects the modulated luminous flux onto a screen.

17. A projection type display apparatus, comprising:
a light source;
a light bulb;
an illumination optical portion which leads a luminous flux emitted from the light source to the light bulb; and
the projection zoom lens according to claim 2, wherein the light bulb optically modulates the luminous flux emitted from the light source and the projection zoom lens projects the modulated luminous flux onto a screen.

* * * * *